United States Patent [19]
Starr

[11] Patent Number: 5,825,716
[45] Date of Patent: Oct. 20, 1998

[54] METHOD OF REVERBERATION REMOVAL FROM SEISMIC DATA AND REMOVAL OF DUAL SENSOR COUPLING ERRORS

[75] Inventor: Joel G. Starr, Richmond, Tex.

[73] Assignee: PGS Tensor Inc., Houston, Tex.

[21] Appl. No.: 852,808

[22] Filed: May 7, 1997

Related U.S. Application Data

[62] Division of Ser. No. 599,717, Feb. 12, 1996.

[51] Int. Cl.⁶ .............................. G01N 1/36; G06F 15/21
[52] U.S. Cl. ................................. 367/24; 367/46; 367/47; 367/48; 364/421
[58] Field of Search .................. 367/24, 46, 47, 367/48; 364/421

[56] References Cited

U.S. PATENT DOCUMENTS

| | | | |
|---|---|---|---|
| 3,587,039 | 6/1971 | Backus et al. | 367/46 |
| 3,629,800 | 12/1971 | Schneider | 367/46 |
| 4,752,916 | 6/1988 | Lowenthal | 367/24 |
| 5,138,583 | 8/1992 | Wason et al. | 367/38 |
| 5,193,077 | 3/1993 | Weiglein et al. | 367/24 |
| 5,309,360 | 5/1994 | Monk et al. | 364/421 |
| 5,408,441 | 4/1995 | Barr et al. | 367/38 |
| 5,572,483 | 11/1996 | Chambers et al. | 367/43 |

FOREIGN PATENT DOCUMENTS

| | | |
|---|---|---|
| 515188 | 11/1992 | European Pat. Off. |
| 9729390 | 8/1997 | WIPO |

OTHER PUBLICATIONS

Peng, C., 64th Annu. SEG Int. oitg, Oct. 28, 1994, pp. 139–142, PAP No. BG 54.

*Primary Examiner*—Nelson Moskowitz
*Attorney, Agent, or Firm*—Gordon T. Arnold

[57] ABSTRACT

A method for eliminating the influence of multiple reflections in seismic data by determining an up going and down going vector wave-field from the vector wave-field, determining a product of the free surface refection coefficient and the down going vector wave-field, and adding the product to the up going vector wave-field. Also provided is a method for eliminating the effects of receiver coupling from seismic data taken in a survey by describing a first cross-equalization filter as a function of the reverberation period, describing a second cross equalization filter as a function of the seismic data, deriving an inverse coupling filter as a function of the first cross-equalization filter and the second-equalization filter, and applying the coupling filter to the seismic data.

15 Claims, 3 Drawing Sheets

Pressure response, water depth = 30m, water velocity = 1500ms, r = 0.2

Velocity response, water depth = 30m, water velocity = 1500ms, r = 0.2

Upgoing wave-field, water depth = 30m, water velocity = 1500ms, r = 0.2

Downgoing wave-field, water depth = 30m, water velocity = 1500ms, r = 0.2

De-reverberated upgoing wave-field, multiplied downgoing wave-field by estimated reflection coefficient and added it back into the upgoing wave field (r = 0.18578)

METHOD OF REVERBERATION REMOVAL FROM SEISMIC DATA AND REMOVAL OF DUAL SENSOR COUPLING ERRORS

This application is a division of application Ser. No. 08/599,717, filed Feb. 12, 1996, status pending.

BACKGROUND OF THE INVENTION

This invention relates to the field of seismic data acquisition and processing. In particular, this invention relates to a method for removing multiple reflections from seismic data. It also relates to removal of coupling errors in dual sensor data.

The problems of multiple reflections in seismic data is well known, and many attempts to remove or lessen its influence on data have been made. See, for example, U.S. Pat. Nos. 4,979,150; 5,163,028; 5,235,554; and 5,365,492 all of which are incorporated herein by reference. It will be noted that the above patents are focused on the problem of free surface multiples caused by reverberations in a water column; however, the free surface multiple reflections can and do occur from reverberations between reflecting interfaces in the earth, also. These four patents cite many others considered relevant for one reason or another, for example, U.S. Pat. Nos. 2,757,356; 3,290,645; 3,299,397; 3,943,484; 3,979,713; 4,134,097; 4,146,871; 4,253,164; 4,296,481; 4,348,749; 4,380,059; 4,437,175; 4,477,887; 4,486,865; 4,520,467; 4,581,724; 4,644,507; 4,644,508; 4,658,387; 4,685,090; 4,733,379; 4,736,345; 4,752,916; 4,821,241; 4,910,716; 4,956,822; 5,251,183; and 5,257,241; all of which are incorporated herein by reference. Further, the following articles may also be considered pertinent in evaluation of the present invention: Monk, D. J., *Wavefield Separation of Twin Streamer Data*, First Break, Vol. 8, No. 3, March, 1988, pgs. 96–104; Brink, M., *Application of Vertical Receiver Arrays in 3D Seismic Exploration*, Society of Exploration Geophysicists, 1988, pgs. 460–463; Wuenschel, P. C., *Removal of the Detector-Ground Coupling Effect in the Vertical Seismic Profiling Environment*, Geophysics, Vol. 53, No. 3, March, 1988, pgs. 359–364; Bell, D. W., et al., *Two-Trace Directional Filter For Processing Offset Vertical Seismic Profiles*, AAPG Bulletin, Vol. 72, No. 3, March 1988, pg. 375; Brink, M. et al., *Marine Seismic Exploration Using Vertical Receiver Arrays: Acquisition in Bad Weather*, 49th Meeting of European Assn. of Exploration Geophysicists, June 1987; Tan, T. H., *Reciprocity Theorem Applied To the Geophone-Ground Coupling Problem*, Geophysics, Vol. 52, No. 12, December 1987, pgs. 1715–1717; Krohn, C. E., *Geophone Ground Coupling*, Geophysics, April 1985, pgs. 56–60; Krohn, C. E., *Geophone Ground Coupling*, Geophysics Vol. 49, No. 6, June 1984, pgs. 722–731; *Plane-wave Decomposition of Seismograms*, Geophysics, Vol. 47, No. 10, October, 1982, pgs. 1375–1401; A. M. Ziolkowski, *Source Array Scaling for Wavelet Deconvolution*, Geophysical Prospecting, Vol. 28, No. 6, December 1980, pgs. 902–918; A. M. Ziolkowski, *Wavelet Deconvolution Using a Source Scaling Law*, Geophysical Prospecting, Vol. 28, No. 6, December 1980, pgs. 872–901; G. M. Hoover, J. T. O'Brien, *The influence of the planted geophone on seismic land data*, Geophysics, Vol. 45, No. 8, August 1980, pgs. 1239–1253, J. White, *Chapter 2-Plane Waves, Seismic Wave Radiation-Transmission and Attenuation*, Seismic Waves, McGraw Hill Publish., 1965, pgs. 15–41, B. Widrow, J. Glover, Jr., J. McCool, J. Kaunitz, C. Williams, R. Hearan, J. Zeidler, E. Dong, Jr., R. Goodlin, *Adaptive Noise Cancelling: Principles and Applications*, Proceedings of the IEEE, Vol. 63, No. 12, December 1975, pgs. 1692–1716; H. Washburn, H. Wiley, *The effect of the placement of a seismometer on its response characteristics*, Presented at the Annual Meeting, Chicago, Apr. 11, 1940.

In addition, the following U.K. Patents were cited in U.S. Pat. No. 4,979,150, which may be redundant to other cited U.S. patents: Ruehle, U.K. Patent No. 1316479, Nov. 23, 1970; Broding, U.K. Patent No. 2004648, Apr. 4, 1979; and Hutchins, U.K. Patent No. 2030400, Apr. 2, 1980.

Other references found when searching in a related area include the following U.S. Pat. Nos., which are incorporated herein by reference: 4,794,572; 4,803,666; 4,817,061; 4,888,743; 4,903,244; 4,912,979; 4,933,913; 4,935,903; 5,027,332; 5,029,146; 5,136,554; 3,350,683; 3,689,874; 4,234,938; 4,935,903; 4,937,793; 4,992,993; 5,163,028; 5,235,554; 5,365,492; and 5,396,472.

Generally, these methods require calibration shooting or estimates of water bottom reflectivity. Calibration shooting is expensive and can introduce its own errors, while estimates of water bottom reflectivity are inherently inaccurate. Current statistical methods are flawed by noise. Further, imperfect coupling between a geophone and the earth and other response differences between co-located hydrophone and geophone pairs (a.k.a. "dual sensors" to those of ordinary skill) exist which are different from pair to pair. Application of the same correction scheme to each dual sensor pair is not an optimum solution.

Accordingly, there is a need for a method for eliminating free surface multiples from seismic data where there exists a free surface reflection coefficient. Further, there is a need for compensation for coupling differences between each sensor in a dual sensor pair.

SUMMARY OF THE INVENTION

It is an object of the present invention to address the above needs, in one embodiment, by a method comprising: determining an up going and a down going vector wave-field from the seismic data, determining a product of the free surface reflection coefficient and the down going vector wave-field, and adding the product to the up going vector wave-field. It has been found that such a method avoids the problems inherent in the previous attempts to eliminate free surface multiples, which were caused by combining particle velocity and pressure data.

According to another aspect of the present invention, a method is provided for eliminating the effects of receiver coupling from seismic data taken in a survey, wherein there exists a reverberation response period. The method comprises: describing a first cross-equalization filter as a function of the reverberation period; describing a second cross-equalization filter as a function of the seismic data; deriving an inverse coupling filter as a function of the first cross-equalization filter and the second-equalization filter; and applying the coupling filter to the seismic data.

DESCRIPTION OF THE DRAWINGS

For a more complete understanding of the present invention and for further advantages thereof, reference is made to the following Detailed Description taken in conjunction with the accompanying drawings, in which.

It is to be noted, however, that the appended drawings illustrate only typical embodiments of this invention and are therefore not to be considered limiting of its scope, for the invention may admit to other equally effective embodiments.

DETAILED DESCRIPTION

Referring now to a specific example embodiment of the present invention, it will be recognized that receiver ghosts are recorded on seismic data when a receiver, located in the water column, senses reflection energy which is reverberating in the water column. The present invention eliminates the free surface multiples by separating the up going and down going vector wave-fields (U(Z) and D(Z) respectively), then adding the product of the down going wave-field U(Z).

Figure 1:
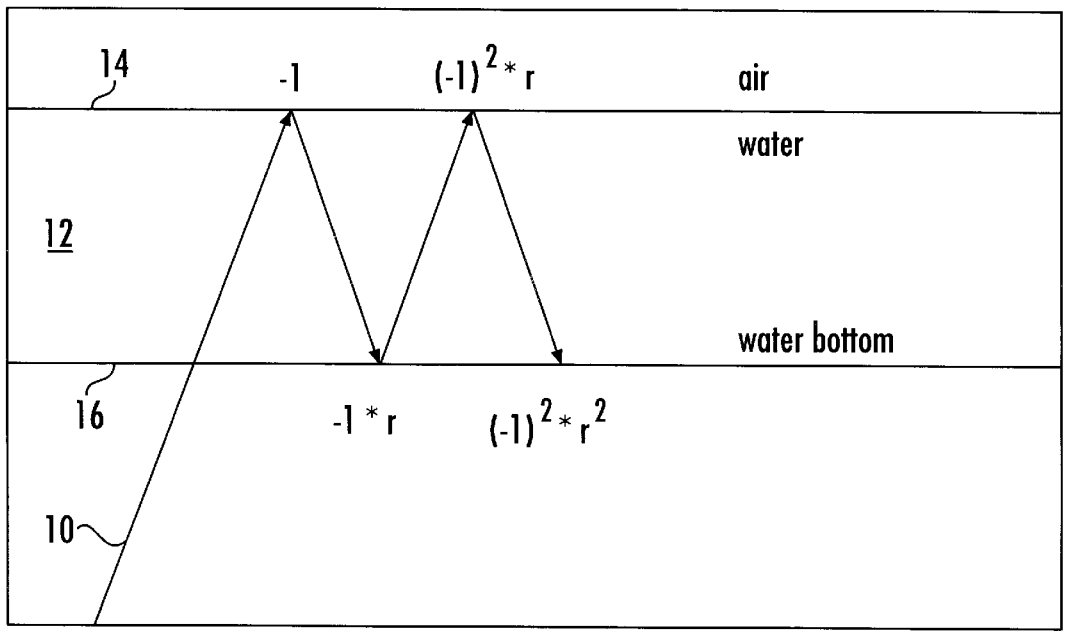
FIG. 1 shows representation of water column reverberation.

A model for the P-wave energy reverberating in the water column was outlined by Milo Backus in 1958. See, *Water Reverberations-Their Nature and Elimination*, Geophysics 1958) incorporated herein by reference. As shown in FIG. 1, P-wave reflection energy 10 arrives in the water column 12 from depth, then bounces between the water surface 14 and the water bottom 16. The relative polarity and amplitude of the P-wave 10 for any given point in time is determined by the product of the reflection coefficients for each successive bounce between the water surface and water-bottom. For detectors located on the water bottom, the pressure response P(Z) and velocity response V(Z) are described by equations (1) and (2).

$$P(Z) = Z^0 - (1+r)Z^1 + r(1+r)Z^2 - r^2(1+r)Z^3 + \ldots - \ldots \quad (1)$$

$$\frac{\alpha}{\cos\theta} V(Z) = Z^0 + (1-r)Z^1 - r(1-r)Z^2 + r^2(1-r)Z^3 - \ldots + \ldots \quad (2)$$

where

P=pressure
V=particle velocity
$Z = e^{iwt}$
$\alpha$=impedance
$\theta$=angle of incidence
r=reflection coefficient of the water bottom
$\tau$=two-way travel time through the water column $$= \frac{2d}{v\cos\theta}$$

d=vertical water depth
v=water velocity

Calculating the closed form of equations (1) and (2) gives equations (3) and (4).

$$P(Z) = 1 + ((1-r)Z)/(1+rZ) \quad (3)$$
$$= (1-Z)/(1+rZ)$$

$$\frac{\alpha}{\cos\theta} V(Z) = 1 - \frac{(1+r)Z}{1+rZ} \quad (4)$$
$$= \frac{1+Z}{1+rZ}$$

The up going vector wave-field, U(Z), is determined by adding equations (3) and (4). The down going vector wave-field, U(Z), is determined by subtracting (3) from (4) (See, Lowenthal and Gardner, 1985), and Lowenthal's U.S. Pat. No. 4,752,916, both of which are incorporated herein by reference). Equations (5) and (6) represent the up going and down going components on an infinite series of water reverberations.

$$U(Z) = \frac{1}{2}\left[\frac{\alpha}{\cos\theta} V(Z) + P(Z)\right] \quad (5)$$

$$= \frac{1}{2}\left[\frac{1+Z}{1+rZ} + \frac{1-Z}{1+rZ}\right]$$

$$= \frac{1}{1+Rz}$$

$$D(Z) = \frac{1}{2}\left[\frac{\alpha}{\cos\theta} V(Z) - P(Z)\right] \quad (6)$$

$$= \frac{1}{2}\left[\frac{1+Z}{1+rZ} - \frac{1-Z}{1+rZ}\right]$$

$$= \frac{Z}{1+Rz}$$

This infinite series of water reverberations can be eliminated by taking the product of the down going wave-field D(Z) and adding it to the up going wave-field U(Z).

$$U(Z) + rD(Z) = (1/(1+rZ)) + r(Z/(1+rZ)) \quad (7)$$
$$= (1+rZ)/(1+rZ)$$
$$= 1$$

where $-1 \leq r \leq +1$

Figure 2:
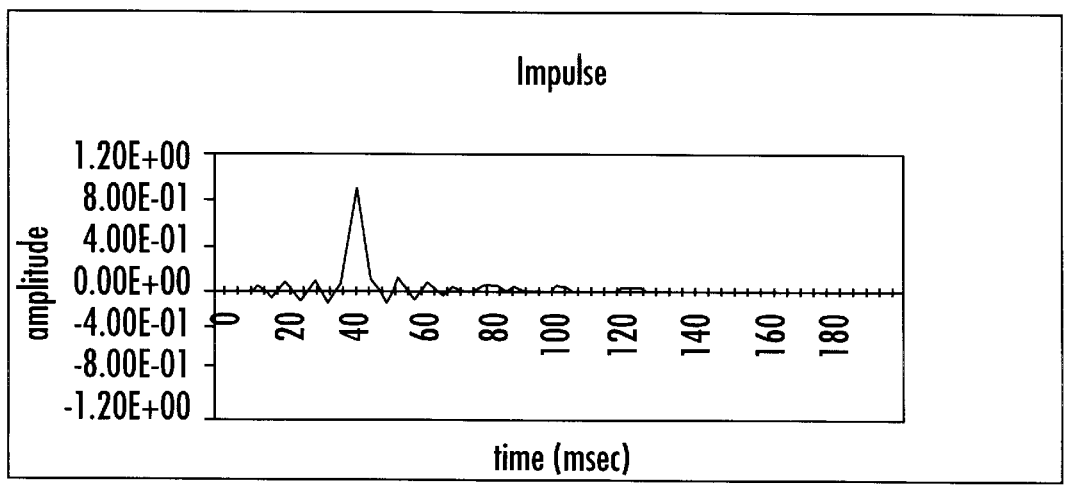
FIG. 2 shows a band limited spike at 40 milliseconds.
Figure 3:
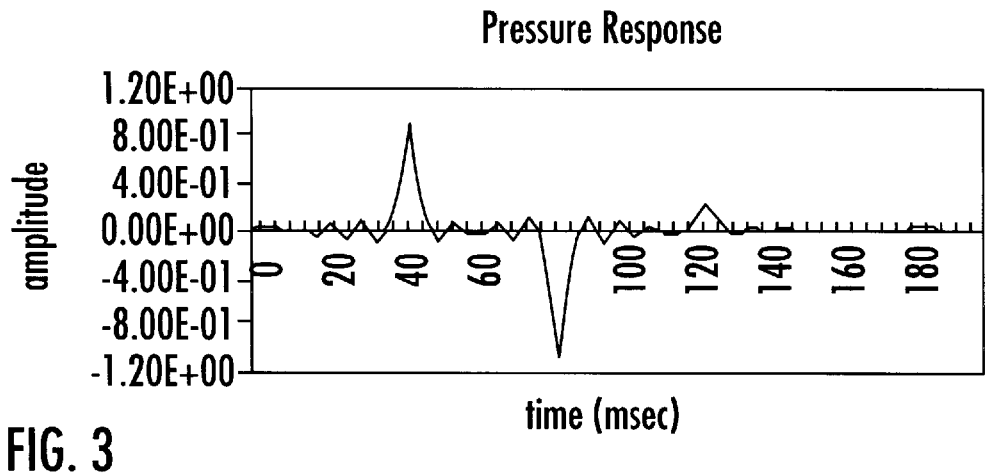
FIGS. 3 and 4 show the pressure and velocity response for detectors on the water bottom at 30 meters water depth.
Figure 4:
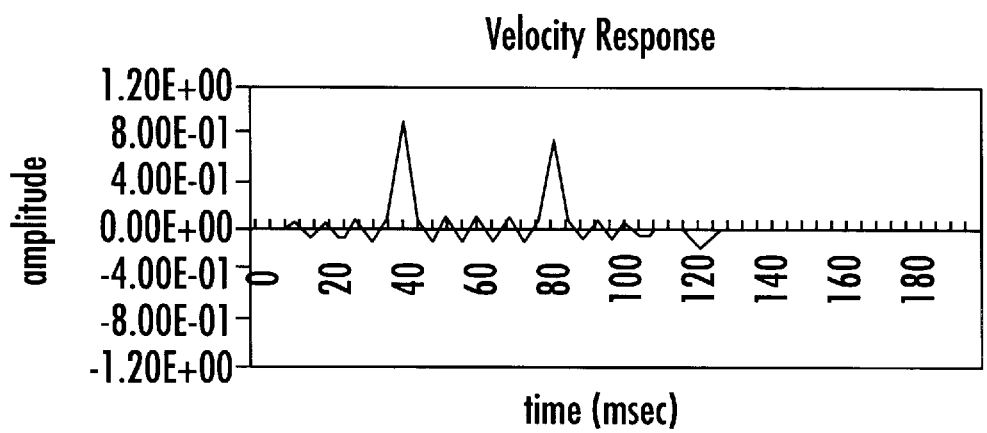
Figure 5:
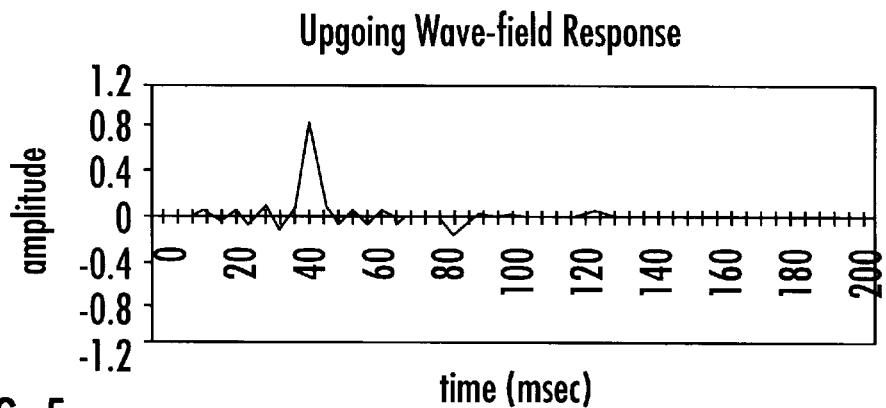
FIGS. 5 and 6 show the separated up going and down going vector wave-fields.
Figure 6:
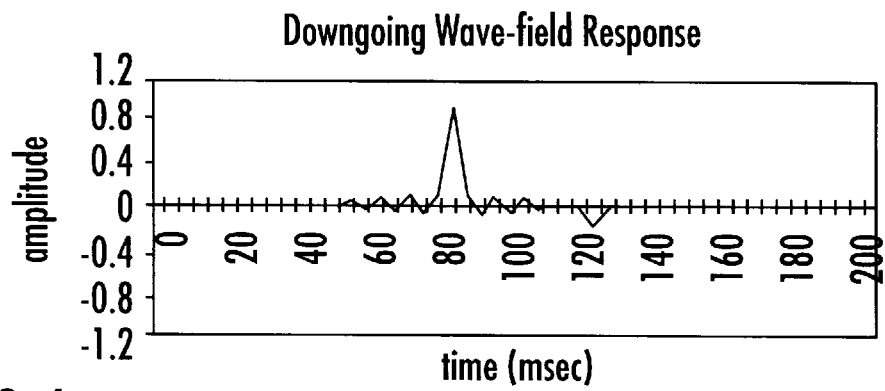
Figure 7:
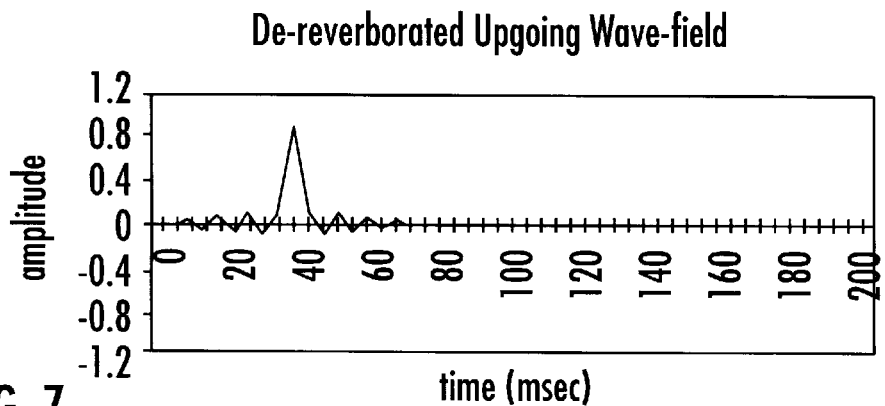
FIG. 7 shows the de-reverberated wave-field by adding the product of an estimated water bottom reflection coefficient and the down going vector wave-field to the up going vector wave-field.

This technique is demonstrated on a zero-offset model shown in FIGS. 2–7. FIG. 2 shows a band limited spike at 40 milliseconds. FIGS. 3 and 4 show the pressure and velocity response for detectors on the water bottom at 30 meters water depth. FIGS. 5 and 6 show the separated up going and down going vector wave-fields. FIG. 7 shows the de-reverberated wave-field by adding the product of an estimated water bottom reflection coefficient and the down going vector wave-field to the up going vector wave-field.

In summary, reverberation-free primary P-wave data is achieved in various embodiments of the invention by recording pressure and particle velocity data, separating the up going and down going vector wave-fields, and adding the product of the water bottom reflection coefficient and the down going vector wave-field to the up going vector wave-field.

Many ways of determining the up going and down going vector wave-fields are acceptable. For example, one method includes collocating seismic data receivers at the free surface, either physically, or mathematically. Also, the free surface is defined to be a reflecting interface such as, for example, an air water interface or the water bottom in the case of water column reverberations in marine seismic data. The free interface also may be defined between geologic layers to reduce reverberations that occur in the earth's structure.

In another example, the determining an up going and a down going vector wave-field further comprises the step of describing the seismic data as a function of the free surface reflection coefficient and a reverberation period in an expanded form.

Further, in some embodiments, the data is collected during the survey with co-located pressure and particle velocity response receivers, which are commonly known in the art. In other embodiments, the data is collected with vertically-spaced pressure receivers.

Alternatively, in another example, the determining an up going and a down going vector wave-field further comprises the step of describing the seismic data as a function of the free surface reflection coefficient and a reverberation period in a closed form.

In one implementation of this aspect of the invention, the seismic data comprises a first set of seismic data in the closed form and a second set of seismic data in the closed form and the first set of seismic data is added to the second set of seismic data, wherein the up going vector wave-field is defined. Alternatively, the first set of seismic data is subtracted from the second set, wherein the down going vector wave-field is defined.

As mentioned above, receiver coupling is also a factor in accuracy of seismic surveys in Dual Sensor bottom reference receiver acquisition (DSSR), where a pressure detector and a particle velocity detector are co-located on the water bottom. A seismic source is fired and the returning reflection energy is recorded by the two detectors. The two recorded data sets are summed and subtracted to separate the up going and down going vector wave-fields. A fundamental issue with this technique is the coupling of the particle velocity detectors to the water bottom.

According to one aspect of the present invention, therefore, a process is provided by which the pressure detector is used as a guide function to estimate the coupling degradation of the recorded particle velocity data. An inverse filter is derived and applied to the particle velocity data prior to vector wave-field separation.

For pressure and particle velocity detectors co-located on the water bottom, the reverberation response is given by equations (1a) and (2a).

$$P(Z) = \frac{1-Z}{1+rZ} \quad (1a)$$

$$\frac{\alpha}{\cos\theta} V(Z) = \frac{1+Z}{1+rZ} \quad (2a)$$

where
P=pressure
V=particle velocity
$Z=e^{iwt}$
$\alpha$=impedance
$\theta$=angle of incidence
r=reflection coefficient of the water bottom
$\tau$=two-way travel time through the water column For the purposes of this discussion, we will be looking at the zero-offset case for which $\cos\theta=1$. We will assume a correction factor has been applied to the particle velocity data to remove $\alpha$.

A filter, $X(\omega)$, which will convert the pressure data into particle velocity data, can be described in the frequency domain as $$P(\omega) X(\omega) = V(\omega) \quad (3a)$$

Solving for $X(\omega)$.

$$X(\omega) = \frac{V(\omega)}{P(\omega)} \quad (4a)$$

Substituting the frequency domain expressions of equations (1a) and (2a) into equation (4a) yields equation (5a).

$$X(\omega) = \frac{1+e^{i\omega\tau}}{1-e^{i\omega\tau}} \quad (5a)$$

Solving for the amplitude and phase components of equation (5a) gives equation (6a).

$$|X(\omega)| = \left[\frac{1+\cos(\omega\tau)}{1-\cos(\omega\tau)}\right]^{1/2} \quad (6a)$$

$$= \left[\tan\left(\frac{\omega\tau}{2}\right)\right]^{-1}$$

$$\phi(\omega) = \tan^{-1}\left[\frac{2\sin(\omega\tau)}{0}\right]$$

$$= \pm\frac{\pi}{2}$$

Thus, for co-located pressure and particle velocity detectors on the water bottom, the filter $X(\omega)$ which converts pressure data into particle velocity data has an amplitude component which is solely dependent on the period of the water reverberations $\tau$, and a constant phase component of 90 degrees. Imperfect coupling of the particle velocity detector to the water bottom can be expressed as a filter, $c(\omega)$, applied to the particle velocity data which distorts the amplitude and phase of the data. Thus a cross-equalization filter, $X_r(\omega)$ calculated from the recorded data will have this filter applied to the particle velocity field.

$$X_c(\omega) = \frac{V(\omega)c(\omega)}{P(\omega)} \quad (7a)$$

The ideal cross-equalization filter $X(\omega)$, without $c(\omega)$, can be calculated with a priori knowledge of $\tau$ using equation (6a). Dividing $X(\omega)$, by $X_c(\omega)$, results in the inverse coupling filter.

$$\frac{1}{c(\omega)} = \frac{X(\omega)}{X_c(\omega)} \quad (8a)$$

This filter can be applied to recorded particle velocity data in order to remove the coupling effects.

In summary, an ideal cross-equalization filter, for pressure and particle velocity detectors co-located on the water bottom, is calculated from knowledge of the period of the water reverberations. This ideal cross-equalization filter is compared to the cross-equalization filter calculated from the recorded data. The result of this comparison is an inverse filter which, when applied to the recorded particle velocity data, removes the effects of receiver coupling.

Other embodiments of the present invention will occur to those of skill in the art which do not depart from the spirit of the invention.

What is claimed is:

1. A method for eliminating the effects of receiver coupling from seismic data taken in a survey, wherein there exists a reverberation response period, the method comprising:

describing a first cross-equalization filter as a function of the reverberation period;

describing a second cross-equalization filter as a function of the seismic data;

deriving an inverse coupling filter as a function of the first cross-equalization filter and the second equalization filter; and applying the coupling filter to the seismic data.

2. A method as recited in claim 1, wherein the first cross-equalization filter comprises a ratio of a first set of seismic data to a second set of seismic data.

3. A method as recited in claim 2, wherein the first and second sets of seismic data are described as a function of the reverberation response period.

4. A method as recited in claim 3, wherein the first set of seismic data is particle velocity data and the second set of seismic data is pressure data.

5. A method as recited in claim 4, wherein the pressure response data and the particle velocity data is expressed as a Z expansion; wherein an expanded pressure and particle velocity data are respectively defined.

6. A method as recited in claim 5, further comprising the step of solving the expanded pressure and expanded particle velocity data respectively, in a frequency domain.

7. A method as recited in claim 6, wherein the first cross-equalization filter comprises a ratio of the expanded particle velocity data to the expanded pressure data, in the frequency domain.

8. A method as recited in claim 7, wherein the ratio of the expanded particle velocity and pressure velocity is solved for an amplitude and a phase component.

9. A method as recited in claim 1, wherein the second cross-equalization filter comprises a product of the first cross-equalization filter and a coupling filter.

10. A method as recited in claim 9, wherein the coupling filter comprises an amplitude and a phase shift of the seismic data.

11. A method as recited in claim 10, wherein the seismic data comprises particle velocity data.

12. A method as recited in claim 1, wherein said deriving an inverse coupling filter further comprises the step of dividing the first cross-equalization filter by the second cross-equalization filter.

13. A method as recited in claim 1, wherein said deriving an inverse coupling filter further comprises the step of solving the first cross-equalization filter for a known reverberation period.

14. A method as recited in claim 1, wherein said applying the inverse coupling filter further comprises the step of applying the inverse coupling filter to the seismic data.

15. A method as recited in claim 14, wherein the seismic data comprises particle velocity data.

* * * * *